United States Patent
Mansour

(10) Patent No.: US 8,457,421 B2
(45) Date of Patent: Jun. 4, 2013

(54) SYSTEM AND METHOD FOR IMAGING

(75) Inventor: Mohamed Farouk Mansour, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 12/872,096

(22) Filed: Aug. 31, 2010

(65) Prior Publication Data

US 2011/0097006 A1 Apr. 28, 2011

Related U.S. Application Data

(60) Provisional application No. 61/254,422, filed on Oct. 23, 2009.

(51) Int. Cl.
  *G06K 9/36* (2006.01)
  *G06K 9/46* (2006.01)
(52) U.S. Cl.
  USPC .......................................................... 382/233
(58) Field of Classification Search
  USPC ....... 382/128–134, 232–253; 600/437; 367/7, 367/11
  See application file for complete search history.

(56) References Cited

U.S. PATENT DOCUMENTS

| 6,042,545 A * | 3/2000 | Hossack et al. ............... 600/443 |
| 7,196,641 B2 * | 3/2007 | Huang et al. .................... 341/50 |
| 2008/0008395 A1 * | 1/2008 | Liu ............................... 382/244 |

* cited by examiner

*Primary Examiner* — Samir Ahmed
(74) *Attorney, Agent, or Firm* — Alan A. R. Cooper; Wade J. Brady, III; Frederick J. Telecky, Jr.

(57) ABSTRACT

An imaging device, is provided, comprising: a plurality of compression circuits configured to receive K initial imaging signals and to generate second through $K^{th}$ modified imaging signals, and a plurality of delay values; and a bit multiplexer configured to generate a compressed bit stream based on a first imaging signal, second through $K^{th}$ modified imaging signals, and the delay values, each compression circuit including: a delay computer configured to determine a delay value by comparing two adjacent initial imaging signals, a delay circuit configured to delay a first of the two adjacent imaging signals by the delay value to generate a delayed imaging signal; a subtractor configured to subtract the delayed signal from a second of the two adjacent imaging signals to generate a reduced imaging signal; and a quantizer configured to generate a quantized imaging signal corresponding to the second of the two adjacent imaging signals.

20 Claims, 3 Drawing Sheets

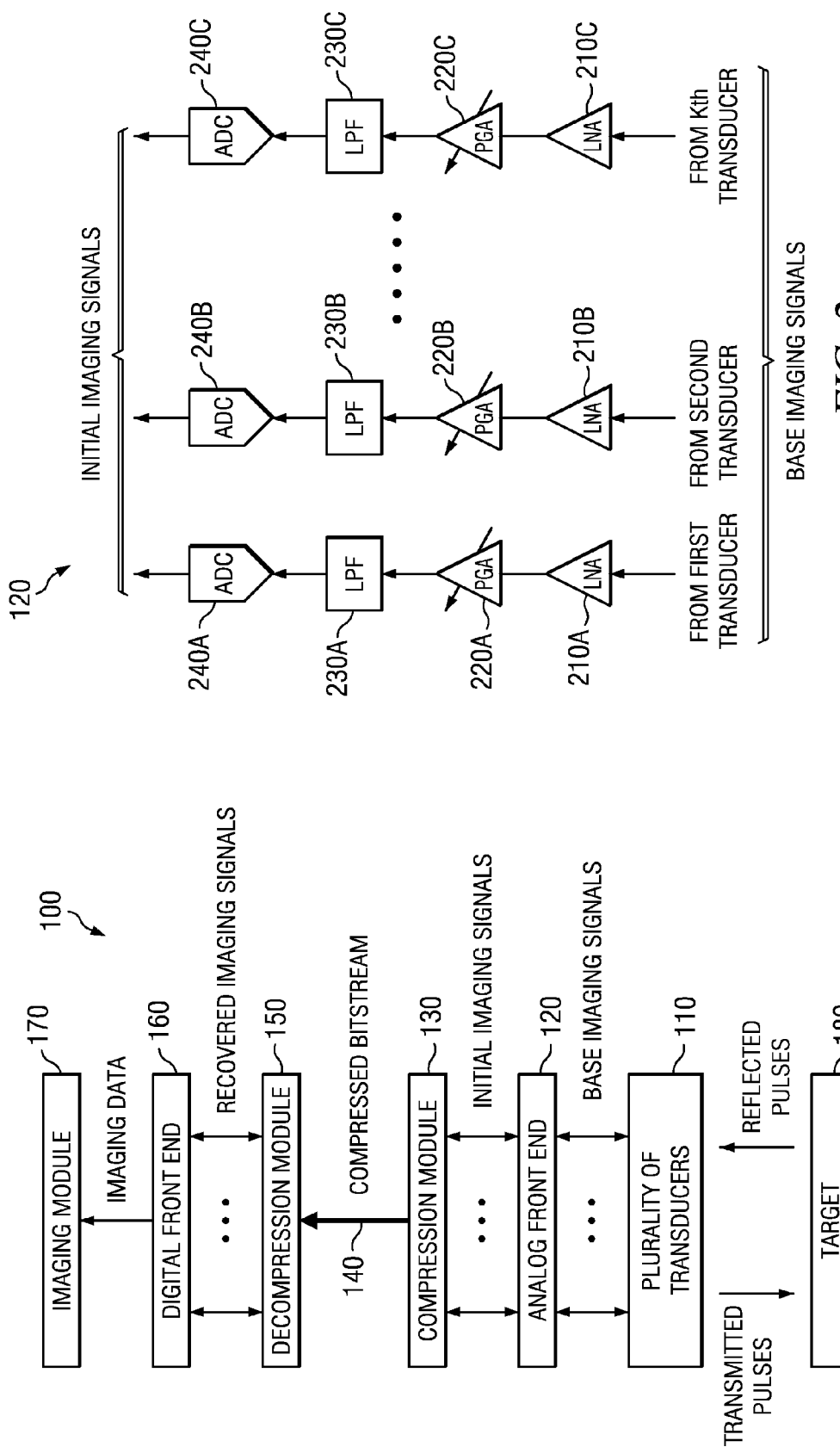

SYSTEM AND METHOD FOR IMAGING

CROSS-REFERENCE TO RELATED APPLICATIONS

This application claims the benefit of Provisional U.S. Application 61/254,422, filed 23 Oct. 2009, and is expressly incorporated herein by reference.

TECHNICAL FIELD

The technical field relates in general to imaging, more particularly to a system and method for passing image data within a pulse-echo imaging device, and even more particularly to a system and method for passing data within and ultrasound imaging device.

BACKGROUND

One common type of imaging device is a pulse-echo imaging device in which the device includes multiple transducers that transmit pulses towards a target to be imaged, and then receive echoes, which are reflected back to the transducers from the target. By analyzing these echoes, the device is able to create an image of the target reflected the pulses. Two common examples of pulse-echo imaging systems are ultrasound imaging devices and radar imaging devices.

As technology in these types of systems advances, however, the number and complexity of the transducers that are used in such imaging devices has risen. This increase in the number and complexity of transducers has lead to challenges in effectively transmitting data within an imaging device, from one element to another.

For example, modern ultrasound probes can employ tens of transducers for improved focusing. A typical phased-array ultrasound probe has 64-256 transducers each operating at a sampling frequency of 25-60 MHz and with a typical sampling resolution of 12 bits. As a result, the data throughput from the transducers to a receiver beamformer in a digital front end is on the order of tens of Gigabits per second. This high throughput complicates the input/output interface of the digital front end of the ultrasound receiver by raising the threat of signal interference and loss along a transmission line leading from an analog front end to a digital front end in the ultrasound unit. Similar complications would be expected in other pulse-echo imaging devices, such as radar imaging devices.

Lossless compression of the ultrasound RF data being passed through the device would result in significant saving in the input/output (I/O) cost and would simplify the interface for digital signal processors without introducing any distortion to the signal.

It would therefore be desirable to provide an imaging device and method in which imaging data is compressed prior to being transmitted from an analog front end to a digital front end within the imaging device, and is then decompressed once transmission is complete. Moreover it is desirable that this compression be performed in a lossless manner so that no imaging data is lost through the compression/decompression process. It is further desirable to exploit the redundancy in the transducers RF data for compression.

SUMMARY

Embodiments described herein provide a system and method for passing imaging data to be sent between an analog front end and a digital front end in an imaging system. In particular, these embodiments apply to a system and method for compressing and decompressing imaging data.

Accordingly, a first disclosed embodiment described herein provides an imaging device, that comprises a plurality of compression circuits configured to receive first through $K^{th}$ initial imaging signals and to generate second through $K^{th}$ modified imaging signals, and a plurality of delay values; and a bit multiplexer configured to generate a compressed bit stream based on the first initial imaging signal, the second through $K^{th}$ modified imaging signals, and the plurality of delay values; a data line configured to pass the compressed bit stream; and a decompressor module configured to convert the compressed bit stream into first through $K^{th}$ recovered imaging signals corresponding to the first through $K^{th}$ initial imaging signals, wherein each compression circuit includes: a delay computer configured to determine a delay value by comparing two adjacent imaging signals selected from the first through $K^{th}$ initial imaging signals a delay circuit configured to delay a first of the two adjacent imaging signals by the delay value to generate a delayed imaging signal; a subtractor configured to subtract the delayed signal from a second of the two adjacent imaging signals to generate a reduced imaging signal; and a quantizer configured to perform a quantization function on the reduced imaging signal to generate a quantized imaging signal corresponding to the second of the two adjacent imaging signals, and wherein K is an integer greater than 2.

A second disclosed embodiment described herein provides an image processing method, comprising: receiving two adjacent initial imaging signals selected from first through $K^{th}$ initial imaging signals; determining a delay value by comparing the two adjacent imaging signals; delaying a first of the two adjacent imaging signals by the delay value to generate a delayed imaging signal; subtracting the delayed signal from a second of the two adjacent imaging signals to generate a reduced imaging signal; performing a quantization function on the reduced imaging signal to generate a quantized imaging signal corresponding to the second of the two adjacent imaging signals; and repeating the operations of receiving two adjacent imaging signals, determining a delay value, delaying a first of the two adjacent imaging signals, subtracting the delayed signal from a second of the two adjacent imaging signals, and performing a quantization function for each pair of adjacent imaging signals selected from first through $K^{th}$ initial imaging signals until every pair of adjacent imaging signals has been selected.

A third disclosed embodiment described herein provides an imaging device, comprising: means for receiving two adjacent initial imaging signals selected from first through $K^{th}$ initial imaging signals; means for determining a delay value by comparing the two adjacent imaging signals; means for delaying a first of the two adjacent imaging signals by the delay value to generate a delayed imaging signal; means for subtracting the delayed signal from a second of the two adjacent imaging signals to generate a reduced imaging signal; means for performing a quantization function on the reduced imaging signal to generate a quantized imaging signal corresponding to the second of the two adjacent imaging signals; and wherein the means for receiving two adjacent imaging signals, means for determining a delay value, means for delaying a first of the two adjacent imaging signals, means for subtracting the delayed signal from a second of the two adjacent imaging signals, and means for performing a quantization function are configured to operated on each pair of adjacent imaging signals selected from first through $K^{th}$ initial imaging signals until every pair of adjacent imaging signals has been selected.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 1 is block diagram showing an imaging device according to disclosed embodiments;

FIG. 2 is a block diagram showing the analog front end of the imaging apparatus of FIG. 1 according to disclosed embodiments;

DETAILED DESCRIPTION

Figure 3:
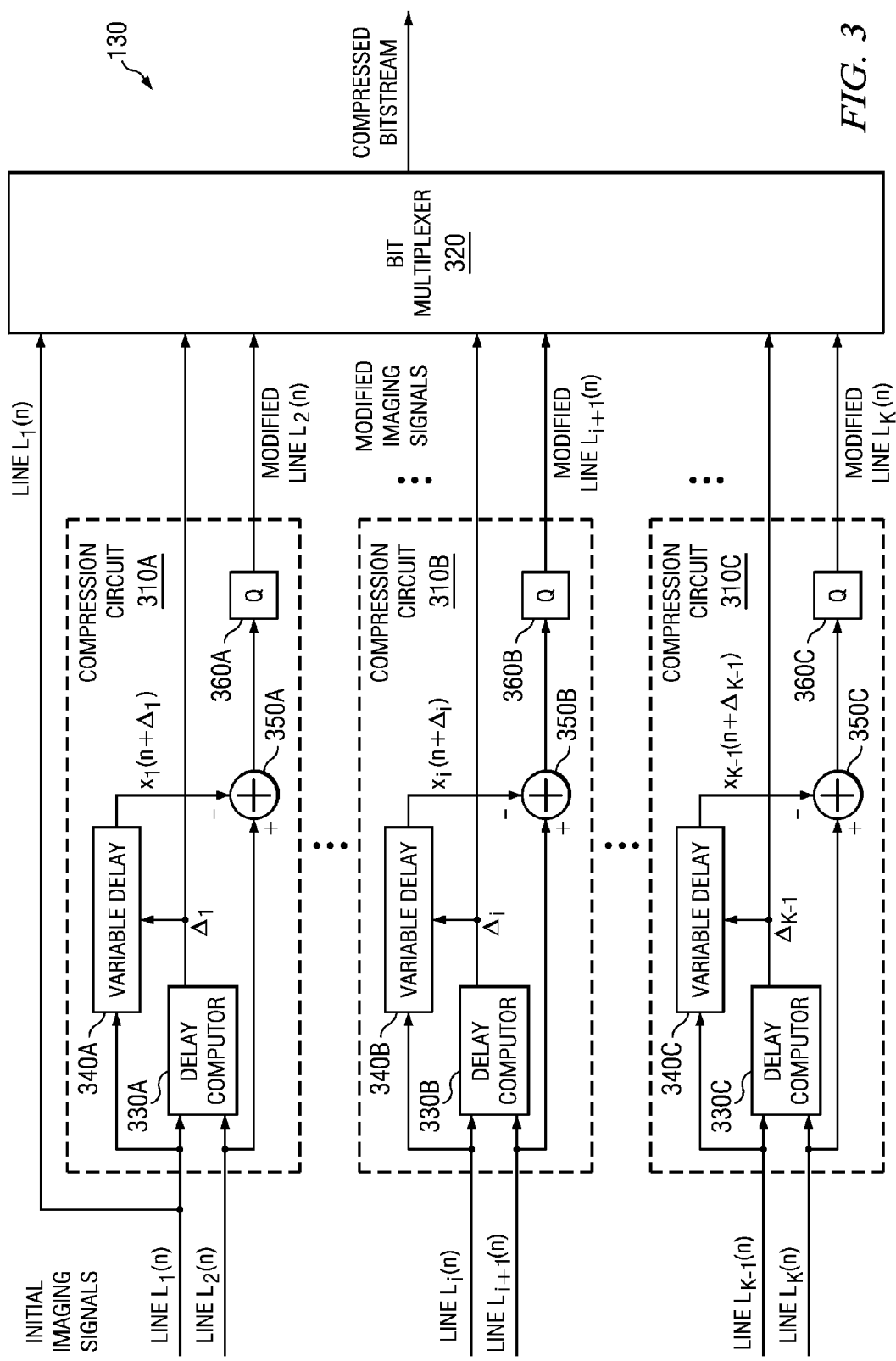
FIG. 3 is a block diagram showing the compression module of the imaging apparatus of FIG. 1 according to disclosed embodiments.

In overview, the present disclosure concerns a system and method for transmitting data within an imaging device. More specifically, it relates to a circuit and related method for compressing and decompressing image data so that the compressed image data can be sent through a portion of the imaging device more efficiently. In particular, a single line of image data is sent in its entirety, while other lines are sent in a more sparse residual form with respect to an adjacent line. The single line sent in its entirety can be used to recover the next line, which can be used to recover the next line, and so on until all of the lines have been recovered.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

In addition, the terms lines, signal lines, and signals, are used interchangeably throughout the specification. These terms are intended to refer to the parallel signals that correspond to data received from a plurality of transducers that operate simultaneously and are controlled by the same control circuit.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Imaging Device

FIG. 1 is block diagram showing an imaging device 100 according to disclosed embodiments. As shown in FIG. 1, the imaging device includes a plurality of transducers 110, an analog front end 120, a compression module 130, a transmission line 140, a decompression module 150, a digital front end 160, and an imaging module 170.

The plurality of transducers 110 operate to send a plurality of transmitted pulses to a target 180, and to receive a plurality of reflected pulses (i.e., echoes) from the target. In one disclosed embodiment the imaging device is an ultrasound imaging device in which the transducers transmit ultrasonic pulses and receive ultrasonic reflections. However, in alternate embodiments, the imaging device could be any sort of pulse-echo imaging system. In particular, alternate embodiments could be radar imaging systems in which the transducers transmit radio frequency (RF) pulses and receive RF reflections.

The plurality of transducers 110 convert the reflected pulses into base imaging signals that are indicative of the reflected pulses. These base imaging signals could be RF signals, optical signals, or the like.

The analog front end 120 operates to clean up the base imaging signals before further operations. It performs front end processing on the base imaging signals to generate initial imaging signals that are to be sent to an imaging module for processing. In various embodiments, the analog front end can include amplification operations, filtering operations, and an analog-to-digital conversion operation. However, any desirable front end processing can be performed in alternate embodiments. In addition, it is possible that in some embodiments the front end processing could be limited to just analog-to-digital conversion and the base imaging signals provided by the plurality of transducers (converted to digital format) could be used directly as initial imaging signals.

The compression module 130 operates to compress the initial imaging signals into a compressed bitstream for transmission to the imaging module. It reduces the initial imaging signals in size so that the signals between the analog front end 120 and the digital front end 160 can be sent at a lower data rate. This reduces interference problems and allows for the use of a thinner or longer transmission line 140.

The transmission line 140 is a connecting line (e.g., a cable) that runs between the analog front end 120 and the digital front end 160 (or rather, between the compression module 130 at one end of the analog front end 120 and the decompression module 150 at one end of the digital front end 160). It can be any appropriate connection line between these elements. However, in many embodiments, it will be a physical transmission line.

The decompression module 150 operates to decompress the compressed bitstream to recover the initial imaging signals, which can then be sent to the digital front end 160 for processing. In the disclosed embodiments, the decompression module 150 performs an inverse of the process performed in the compression module to recover the initial imaging signals.

The digital front end 160 operates to prepare the recovered imaging signals for processing by the imaging module. In the disclosed embodiments the digital front end can include a beam former, an envelope detector, and a demodulator. In general it processes the recovered imaging signals to generate imaging data.

The imaging module 170 then uses the imaging data to generate an image.

FIG. 2 is a block diagram showing the analog front end of the imaging apparatus of FIG. 1 according to disclosed embodiments. As shown in FIG. 2, the analog front end includes a plurality of low noise amplifiers (LNAs) 210A . . . 210C, a plurality of programmable amplifiers (PGAs) 220A . . . 220C, a plurality of low pass filters (LPFs) 230A . . . 230C, and a plurality of analog-to-digital converters (ADCs) 240A . . . 240C. The analog front end 120 includes a series of elements for each signal line, i.e., for the base imaging signals received from each transducer in the plurality of transducers 110.

The LNAs 210A . . . 210C and the PGAs 220A . . . 220C operate to amplify the base imaging signals to get them to a desired amplitude. The LPFs 230A . . . 230C operate to filter out high frequency portions of the base imaging signals to keep them in a desired frequency range. The ADCs 240A . . . 240C convert the base imaging signals from analog format into a digital format that is easier to send over the transmission line 140, and are in the proper format for use by the digital front end 160.

FIG. 3 is a block diagram showing the compression module 130 of the imaging apparatus 100 of FIG. 1 according to disclosed embodiments. As shown in FIG. 3, the compression module 130 includes a plurality of compression circuits 310A . . . 310C and a bit multiplexer 320.

The compression circuits 310A . . . 310C each operate on two adjacent initial imaging signals (i.e., lines) received from the analog front end, and use the two adjacent signals (i.e., lines) to generate a modified imaging signal and a delay signal Δ.

The bit multiplexer 320 takes one of the initial imaging signals, all of the modified imaging signals, and all of the delay signals and forms them into a compressed bit stream that it transmits over the transmission line 140 to the decompression module 150. It can use any acceptable compression technique. In the disclosed embodiments, however, by way of example, only, an efficient entropy encoding system (e.g., Huffman coding) is employed. However, in alternate embodiments, other kinds of compression can be employed.

The compression module 130 operates to losslessly compress digital data to significantly and reversibly reduce the energy of the data, and encode the residual data rather than the original high-energy data. The proposed compression operation processes many scan-lines simultaneously to achieve this goal. The operation of the compression module is essentially the inverse of what is done by a beamformer, which uses a delay-and-sum procedure to obtain constructive interference from adjacent transdures. In contrast, the compression module uses a delay-and-subtract procedure to produce destructive interference and significantly reduce the power of adjacent lines.

In a pulse-echo imaging system, such as an ultrasound scanning device, scan lines from successive (i.e., adjacent) scan lines generally contain similar data with a slight time shift caused by geometric displacement. The disclosed compression module 130 exploits the similarity between successive scan lines to reduce the line energy after compensating for the time shift between successive lines.

As shown in FIG. 3, the compression circuits 310A . . . 310C each include a delay computer 330A . . . 330C, a variable delay circuit 340A . . . 340C, a subtractor 350A . . . 350C, and a quantizer 360A . . . 360C. For ease of disclosure, compression circuit 310B will be described in detail. The operation of this exemplary compression circuit 310B can be extended to describe the operation of all of the compression circuits 310A . . . 310C.

The delay computer 330B receives imaging signals from two adjacent signal lines line $L_i(x)$ and line $L_{i+1}(x)$, and uses these to generate a delay value $\Delta_i$.

The determination of the delay $\Delta_i$ can be performed in any suitable manner. In a first embodiment the delay $\Delta_i$ can be determined by looking for a delay value that provides a maximum cross correlation between the first of the two adjacent signals lines $L_i(x)$ and the second of the two adjacent signals lines $L_{i+1}(x)$. The delay value that results in a maximum cross correlation between these two lines is the desired delay $\Delta_i$.

In a second embodiment it is assumed that the cross correlation is 1. The delay $\Delta_i$ in this case can be determined by performing an integer shift of delay values of the first of the two adjacent signals lines $L_i(x)$ with respect to the second of the two adjacent signals lines $L_{i+1}(x)$ and determining at what point their difference of these two lines results in a minimum value. The delay values in this case are stepped through a relatively small number of values (e.g., 10 to 20) that are symmetrical around zero (i.e., from −a to a, where a is in the range of 5 to 10). The step size of the delay value will depend upon the frequency of the underlying signal. A higher sampling frequency will result in a bigger range of delay values, while a lower frequency will allow for correspondingly lower delay values. The delay value that results in a minimum difference is the delay $\Delta_i$.

The first embodiment, determining cross correlation, will be described in greater detail by way of example. For a given scan line and a given transducer line, The cross correlation $\gamma_i(n)$ between two adjacent lines (line i and line i+1) can be represented as follows:

$$\gamma_i(n) = E\{L_i(x)L_{i+1}(x)\}, \quad (1)$$

where $L_i(x)$ represents the signal on the $i^{th}$ line.

In some implementations this can be approximated as:

$$\sim\gamma_i(n) = \Sigma_x L_i(x)L_{i+1}(x+n). \quad (2)$$

This determination could be further simplified by computing the cross correlation in segments, e.g., in a small interval that is a function of the sampling frequency and the probe geometry. Framing can also be used to improve the accuracy of this estimate, with a typical frame size being in the range of 64. Delta modulation could also be used during the decompression operation to further reduce scan-line energy The delay value $\Delta_i$ can then be determined as:

$$\Delta_i = argmax(|\gamma_i(n)|) \quad (3)$$

The variable delay circuit 340 receives the first of the two adjacent signals lines $L_i(x)$ and delays it by the delay value $\Delta_i$ to generate a delayed signal line $L_i(x-\Delta_i)$. This can be described more specifically by the following equation:

The subtractor 350 subtracts the delayed signal line $L_i(x-\Delta_i)$ from the second of the two adjacent signal lines $L_{i+1}(x)$ to generate a residual data line $e_{i+1}(x)$. This can be a direct subtraction:

$$e_{i+1}(x) = L_{i+1}(x) - L_i(x-\Delta_i), \quad (4)$$

or, in alternate embodiments, it can involve the cross correlation:

$$e_{i+1}(x) = L_{i+1}(x) - \gamma_i(\Delta_i)L_i(x-\Delta_i). \quad (5)$$

Regardless, the subtractor 350 generates a residual data line (i.e., a residual image signal).

The quantizer 360 then quantizes the residual data line (the residual image signal) using an acceptable quantization operation to generate the modified signal line, i.e., the modified image signal. In one embodiment, for example, efficient Golomb coding can be used for quantization.

As noted above, the bit multiplexer 320 takes the first initial imaging signal, the modified imaging signals from all of the compression circuits 310A . . . 310C, and the delay values from all of the compression circuits 310A . . . 310C, and passes them along the transmission line 140 in the compressed bit stream.

The decompression module 150 then performs the inverse of the operation described above to recover the initial imaging signals.

In the disclosed embodiments, the imaging apparatus 100 is an ultrasound imaging apparatus. In this case, the transducers 110 are ultrasonic transducers that emit an ultrasonic pulse and detect an ultrasonic echo. However, this is by way of example only. The disclosed system is equally applicable to any pulse-echo imaging system. For example, in alternate embodiments it could be applied to a radar imaging system in which the transducers 110 are radio transducers that emit a radar pulse and detect a radar echo. Application to other pulse-echo systems is likewise possible.

Imaging Method

Figures 4, 5:
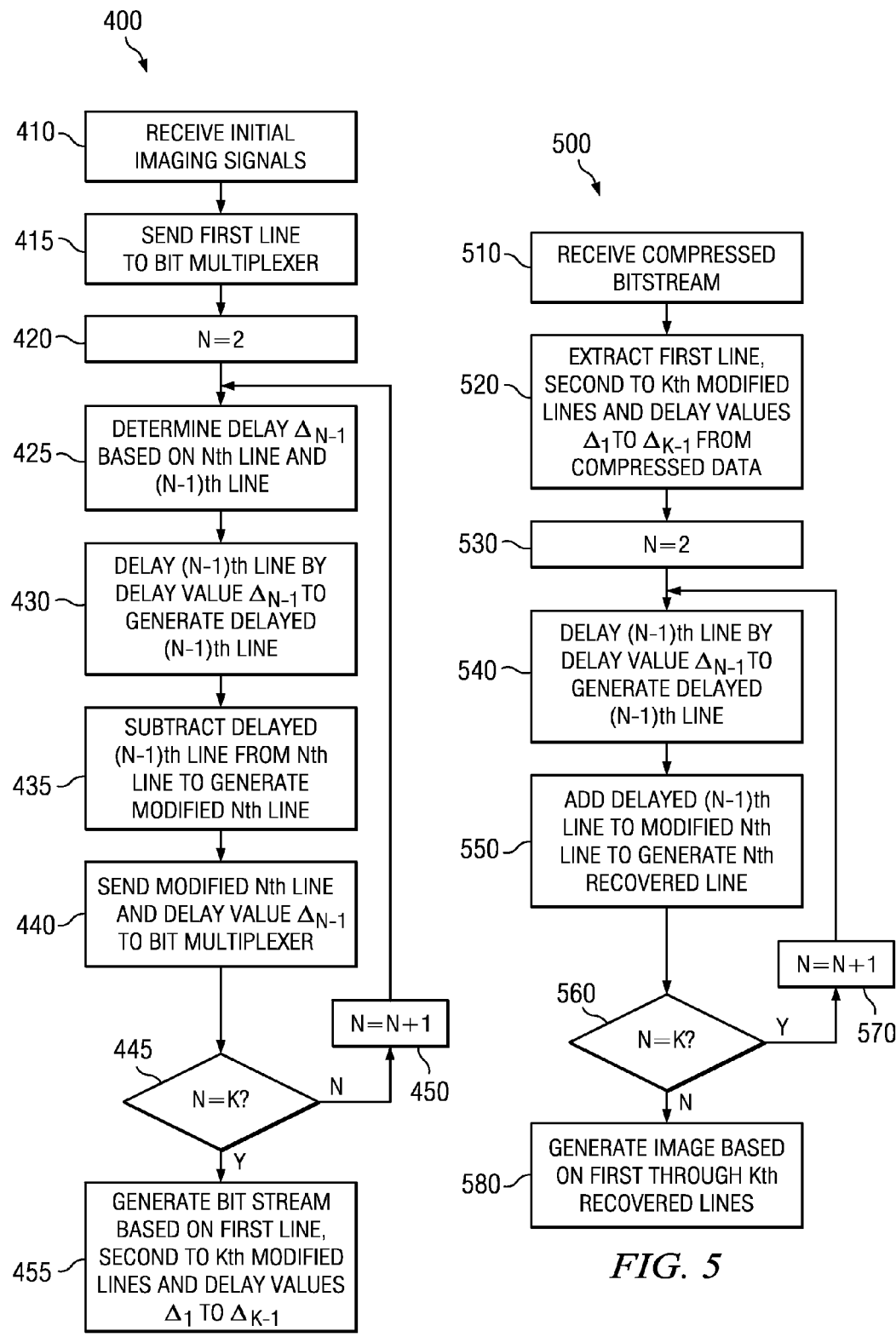
FIG. 4 is a flow chart showing a compression operation according to disclosed embodiments.
FIG. 5 is a flow chart showing a decompression operation according to disclosed embodiments.

FIG. 4 is a flowchart illustrating an image data compression operation, according to disclosed embodiments. As shown in FIG. 4, the operation begins when a system receives initial imaging signals that are indicative of a series of received imaging signals. (400) These initial imaging signals correspond to the signals received from the plurality of transducers 110, and represent pulse echoes received by the plurality of transducers. The initial imaging signals are divided up into a series of successive (i.e., adjacent) lines that correspond to the plurality of transducers 110.

In the disclosed embodiment, these initial imaging signals are received from a front end that has processed the signals subsequent to receiving them. However, in alternate embodiments, the compression operation could be performed on imaging signals received directly from a set of transducers. Likewise, additional processing could be performed prior to performing the compression operation.

A first line corresponding to a signal from a first transducer is sent to a bit multiplexer to be encoded directly. (415) This first line represents a base set of information from which the data on subsequent line can be referenced. As a result, the information on the first line is sent in its entirety. However, for each subsequent line, it is only necessary to send information regarding how that line differs from the immediately preceding line.

Therefore, an index value N that represents the line position is used. And since the process continues with the second line, N is initially set equal to 2. (420)

The processing of the current line (i.e., the $N^{th}$ line) begins with a determination of a delay $\Delta_{N-1}$ based on the $N^{th}$ line and the $(N-1)^{th}$ line. (425) The delay $\Delta_{N-1}$ represents a delay between the $N^{th}$ line and the $(N-1)^{th}$ line. For example, the delay $\Delta_1$ represents a delay between the first line and the second line.

The determination of the delay can be performed in any suitable manner. In a first embodiment the delay $\Delta_{N-1}$ can be determined by looking for a delay value that provides a maximum cross correlation between the $(N-1)^{th}$ line and the $N^{th}$ line. The delay value that results in a maximum cross correlation between these two lines is the delay $\Delta_{N-1}$. An exemplary implementation of how a determination of the delay $\Delta_{N-1}$ according to the first disclosed embodiment is described above with respect to equations (1)-(xx).

In a second embodiment it is assumed that the cross correlation is 1. The delay $\Delta_{N-1}$ in this case can be determined by performing an integer shift of delay values of the $(N-1)^{th}$ line with respect to the $N^{th}$ line and determining at what point their difference of these two lines results in a minimum energy of the error line. The delay values in this case are stepped through a relatively small number of values (e.g., 10 to 20) that are symmetrical around zero (i.e., from −a to a, where a is in the range of 5 to 10). The step size of the delay value will depend upon the frequency of the underlying signal. A higher frequency will result in a bigger range of delay values, while a lower frequency will allow for correspondingly lower delay values. The delay value that results in a minimum difference is the delay $\Delta_{N-1}$.

Once the proper delay $\Delta_{N-1}$ is determined, the $(N-1)^{th}$ line is delayed by that delay $\Delta_{N-1}$ to generate a delayed $(N-1)^{th}$ line. (430) This delayed line represents what the $(N-1)^{th}$ line would look like if it was synchronized with the $N^{th}$ line.

The delayed $(N-1)^{th}$ line is then subtracted from the $N^{th}$ line to generate a modified $N^{th}$ line. (435) This modified $N^{th}$ line represents a residual for the line. It indicates only how the $N^{th}$ line differs from the $(N-1)^{th}$ line. And since the $(N-1)^{th}$ line and the $N^{th}$ line are generally very similar to each other, the residual line information will generally represent far less data than the entirely of the $N^{th}$ line.

The method then sends the modified $N^{th}$ line and the delay $\Delta_{N-1}$ to the bit multiplexer for encoding. (440) Even when the delay $\Delta_{N-1}$ is added to the modified $N^{th}$ line, the amount of data will still generally be far less than the amount of data required to send the unmodified $N^{th}$ line.

A determination is then made as to whether N is equal to K (445), i.e., whether the last line has been reached or whether there are more lines to consider. If N is not equal to K, i.e., there are more lines to consider, then N is incremented by one and the operations of determining the delay $\Delta_{N-1}$, generating the delayed $(N-1)^{th}$ line, subtracting the delayed $(N-1)^{th}$ line from the $N^{th}$ line, and sending the modified $N^{th}$ line to the multiplexer (425-440) are repeated for the new value of N.

If, however, N is equal to K, i.e., the last line has been considered, a bit multiplexer will generate a bit stream based on the entire first line, the second to $K^{th}$ modified lines, and the delay values $\Delta_1$ to $\Delta_{K-1}$. (455) These values will allow a decompression operation to extract the entirety of the first through $K^{th}$ lines, but will require the transmission of a fraction of the data necessary to send the entirety of the first through $K^{th}$ lines.

FIG. 5 is a flowchart illustrating an image data decompression operation, according to disclosed embodiments. As shown in FIG. 5, the operation begins when a system receives a compressed bit stream. (510) In some embodiments this compressed bit stream can be sent across a data line that connects an analog portion of a device with a digital portion of the device. The compressed bit stream contains information necessary to reconstruct first through $K^{th}$ image lines (i.e., first through $K^{th}$ image signals). In particular, the first line is sent in its entirely, while second through $K^{th}$ modified lines, which represent residual portions of the lines, are sent. Delay values $\Delta_1$ to $\Delta_{K-1}$ are also sent, which were used to generate the second through $K^{th}$ modified lines, and which can be used to reconstruct the original unmodified second through $K^{th}$ initial lines.

The operation then extracts the first line, the second through $K^{th}$ modified lines, and the delay values $\Delta_1$ to $\Delta_{K-1}$ from the compressed data. (520) The first line is extracted directly as a first recovered line. The second through $K^{th}$ modified lines are used in conjunction with the delay values $\Delta_1$ to $\Delta_{K-1}$ to generate second through $K^{th}$ recovered lines Because the first line has already been sent, it is only necessary for the operation to take further action to recover the second through $K^{th}$ lines. As a result, an index value N is set to be equal to 2. (530) In other words, the operation begins the recovery process on the second line.

The operation delays the $(N-1)^{th}$ line by the delay value $\Delta_{N-1}$ to generate a delayed $(N-1)^{th}$ line. (540) This delayed $(N-1)^{th}$ line is the same delayed $(N-1)^{th}$ line that was used in conjunction with the unmodified initial $N^{th}$ signal line to generate the modified $N^{th}$ line.

The delayed $(N-1)^{th}$ line is then added to the modified $N^{th}$ line to generate a recovered $N^{th}$ line that corresponds to the $N^{th}$ initial signal line. (550) In this part of the operation, the process used to generate the modified $N^{th}$ line is simply reversed to generate the recovered $N^{th}$ line.

A determination is then made as to whether N is equal to K (560), i.e., whether the last line has been reached or whether there are more lines to consider. If N is not equal to K, i.e., there are more lines to consider, then N is incremented by one and the operations of generating the delayed $(N-1)^{th}$ line, and using the delayed $(N-1)^{th}$ line to generate a recovered $N^{th}$ line (540 & 550) are repeated for the new value of N.

If, however, N is equal to K, i.e., the last line has been considered, an image is generated based on the first through $K^{th}$ recovered lines. (580)

In the disclosed embodiments, a first line is sent in its entirety, and second through $K^{th}$ lines are sent in a residual form, ultimately with respect to the first line. However, the transmission of the first line in its entirety is simply one implementation. In alternate implementations, a different line can be sent in its entirety, and other lines sent in residual form. For example, the $K^{th}$ line could be sent in its entirety, while the first through $(K-1)^{th}$ lines were sent in residual form. Likewise an intermediate line could be sent in its entirety, while the lines on either side of the intermediate line were sent in residual form (e.g., the $4^{th}$ line sent in its entirety, while the first through $3^{rd}$ and the $5^{th}$ through $K^{th}$ lines were sent in residual form).

In the disclosed embodiments, the imaging methods 400 and 500 are ultrasound imaging methods. In this case, the initial imaging signals are representative of ultrasonic echoes. However, this is by way of example only. The disclosed method is equally applicable to any pulse-echo imaging system. For example, in alternate embodiments the disclosed methods could be applied to a radar imaging system in which the initial imaging signals are representative of radar echoes. Application to other pulse-echo systems is likewise possible.

Conclusion

This disclosure is intended to explain how to fashion and use embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An imaging device, comprising:
    a plurality of compression circuits configured to receive first through $K^{th}$ initial imaging signals and to generate second through $K^{th}$ modified imaging signals, and a plurality of delay values; and
    a bit multiplexer configured to generate a compressed bit stream based on the first initial imaging signal, the second through $K^{th}$ modified imaging signals, and the plurality of delay values;
    a data line configured to pass the compressed bit stream; and
    a decompressor module configured to convert the compressed bit stream into first through $K^{th}$ recovered imaging signals corresponding to the first through $K^{th}$ initial imaging signals,
    wherein each compression circuit includes:
        a delay computer configured to determine a delay value by comparing two adjacent imaging signals selected from the first through $K^{th}$ initial imaging signals
        a delay circuit configured to delay a first of the two adjacent imaging signals by the delay value to generate a delayed imaging signal;
        a subtractor configured to subtract the delayed signal from a second of the two adjacent imaging signals to generate a reduced imaging signal; and
        a quantizer configured to perform a quantization function on the reduced imaging signal to generate a quantized imaging signal corresponding to the second of the two adjacent imaging signals, and
    wherein K is an integer greater than or equal to 2.

2. The imaging device of claim 1, wherein the delay computer is configured to determine the delay value at a frame level.

3. The imaging device of claim 1, further comprising:
    first through $K^{th}$ transducers configured to respectively transmit first through $K^{th}$ ultrasound pulses, receive first through $K^{th}$ ultrasound reflections, and pass first through $K^{th}$ unadjusted imaging signals indicative of the first through $K^{th}$ ultrasound reflections; and
    an analog front end configured to perform analog front end processing on the first through $K^{th}$ unadjusted imaging signals to provide the first through $K^{th}$ initial imaging signals.

4. The imaging device of claim 3, wherein analog front end processing includes at least one of amplification, filtering, and analog-to-digital conversion.

5. The imaging device of claim 1, further comprising:
    a digital front end configured to process the first through $K^{th}$ recovered imaging signals to generate imaging data; and
    an imaging module configured to generate an ultrasound image based on the imaging data.

6. The device of claim 5, wherein the digital front end further comprises a beam former, an envelope detector, and a demodulator configured to perform the processing of the first through $K^{th}$ imaging signals to generate imaging data.

7. The imaging device of claim 1, wherein the imaging device is one of an ultrasound imaging device and a radar device.

8. An image processing method, comprising:
    receiving two adjacent initial imaging signals selected from first through $K^{th}$ initial imaging signals;

determining a delay value by comparing the two adjacent imaging signals;

delaying a first of the two adjacent imaging signals by the delay value to generate a delayed imaging signal;

subtracting the delayed signal from a second of the two adjacent imaging signals to generate a reduced imaging signal;

performing a quantization function on the reduced imaging signal to generate a quantized imaging signal corresponding to the second of the two adjacent imaging signals; and repeating the operations of receiving two adjacent imaging signals, determining a delay value, delaying a first of the two adjacent imaging signals, subtracting the delayed signal from a second of the two adjacent imaging signals, and performing a quantization function for each pair of adjacent imaging signals selected from first through $K^{th}$ initial imaging signals until every pair of adjacent imaging signals has been selected.

9. The image processing method of claim 8, further comprising:

generating a compressed bit stream based on a first initial imaging signal selected from the first through $K^{th}$ initial imaging signals, second through $K^{th}$ quantized imaging signals generated by the repeated performing of the quantization function, and a plurality of delay values generated by the repeated determining of the delay value;

transmitting the compressed bit stream over a data line; and converting the compressed bit stream into first through $K^{th}$ recovered imaging signals corresponding to the K initial imaging signals.

10. The image processing method of claim 8, further comprising:

transmitting first through $K^{th}$ ultrasound pulses;

receiving first through $K^{th}$ ultrasound reflections;

passing first through $K^{th}$ unadjusted imaging signals indicative of the first through $K^{th}$ ultrasound reflections;

performing analog front end processing on the K unadjusted imaging signals to provide the first through $K^{th}$ initial imaging signals.

11. The image processing method of claim 8, wherein analog front end processing includes at least one of amplification, filtering, and analog-to-digital conversion.

12. The image processing method of claim 8, further comprising:

processing the first through $K^{th}$ recovered imaging signals to generate imaging data; and generating an ultrasound image based on the imaging data.

13. The image processing method of claim 8, wherein the initial imaging signals are generated in an ultrasound imaging device.

14. The image processing method of claim 8, wherein the initial imaging signals are generated in a radar device.

15. An imaging device, comprising:

means for receiving two adjacent initial imaging signals selected from first through $K^{th}$ initial imaging signals;

means for determining a delay value by comparing the two adjacent imaging signals;

means for delaying a first of the two adjacent imaging signals by the delay value to generate a delayed imaging signal;

means for subtracting the delayed signal from a second of the two adjacent imaging signals to generate a reduced imaging signal;

means for performing a quantization function on the reduced imaging signal to generate a quantized imaging signal corresponding to the second of the two adjacent imaging signals; and wherein the means for receiving two adjacent imaging signals, means for determining a delay value, means for delaying a first of the two adjacent imaging signals, means for subtracting the delayed signal from a second of the two adjacent imaging signals, and means for performing a quantization function are configured to operated on each pair of adjacent imaging signals selected from first through $K^{th}$ initial imaging signals until every pair of adjacent imaging signals has been selected.

16. The imaging device of claim 15, further comprising:

means for generating a compressed bit stream based on a first initial imaging signal selected from the first through $K^{th}$ initial imaging signals, second through $K^{th}$ quantized imaging signals generated by the repeated operation of the means for performing of the quantization function, and a plurality of delay values generated by the repeated operation of the means for determining of the delay value;

means for transmitting the compressed bit stream over a data line; and means for converting the compressed bit stream into first through $K^{th}$ recovered imaging signals corresponding to the first through $K^{th}$ initial imaging signals.

17. The imaging device of claim 15, further comprising:

means for transmitting first through $K^{th}$ ultrasound pulses;

means for receiving first through $K^{th}$ ultrasound reflections;

means for passing first through $K^{th}$ unadjusted imaging signals indicative of the K ultrasound reflections;

means for performing analog front end processing on the first through $K^{th}$ unadjusted imaging signals to provide the first through $K^{th}$ initial imaging signals.

18. The imaging device of claim 15, wherein analog front end processing includes at least one of amplification, filtering, and analog-to-digital conversion.

19. The imaging device of claim 15, further comprising:

means for processing the first through $K^{th}$ recovered imaging signals to generate imaging data; and means for generating an ultrasound image based on the imaging data.

20. The imaging device of claim 15, wherein the initial imaging signals are generated in one of an ultrasound imaging device and a radar device.

* * * * *